(No Model.)
J. M. ROSEBROOKS.
VEHICLE WHEEL.
No. 328,068. Patented Oct. 13, 1885.
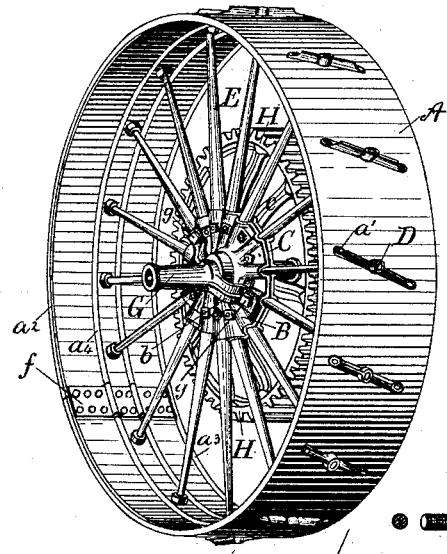
Fig. 1.
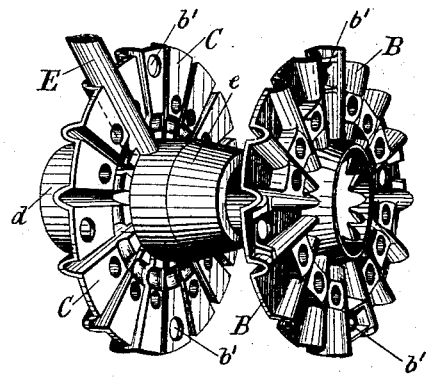
Fig. 2.
Fig. 3.
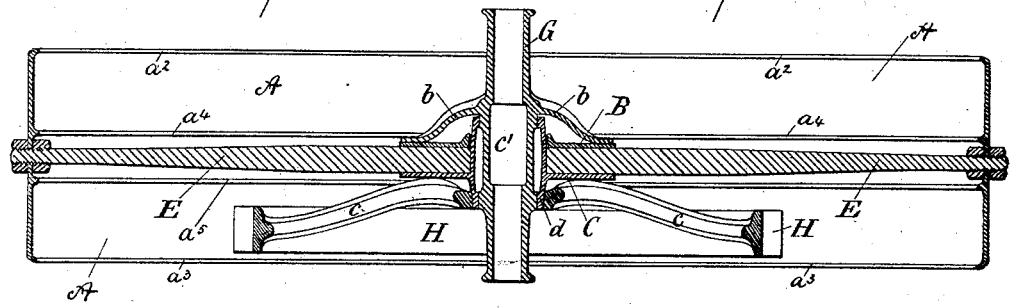
Fig. 4.
Fig. 5.
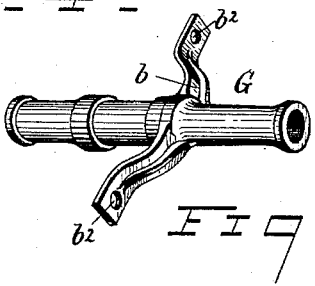
Fig. 6.
WITNESSES:
W. Lovegrove
E. C. Pattison
INVENTOR:
John Milton Rosebrooks
By J. Russell Parsons
his attorney in facts

UNITED STATES PATENT OFFICE.

JOHN MILTON ROSEBROOKS, OF HOOSICK FALLS, NEW YORK, ASSIGNOR TO THE WALTER A. WOOD MOWING AND REAPING MACHINE COMPANY, OF SAME PLACE.

VEHICLE-WHEEL.

SPECIFICATION forming part of Letters Patent No. 328,068, dated October 13, 1885.

Application filed July 30, 1885. Serial No. 173,080. (No model.)

*To all whom it may concern:*

Be it known that I, JOHN MILTON ROSEBROOKS, of the village of Hoosick Falls, in the county of Rensselaer and State of New York, have made certain new and useful Improvements in Wheels for Vehicles, Agricultural Machines, and other Purposes; and I do declare the following to be a full, clear, and exact description of the same, reference being had to the accompanying drawings, making a part of this specification, in which the wheel is represented as applicable to machines for harvesting grain. Other uses to which my invention as applicable will be apparent to any person skilled in the art.

In the drawings, Figure 1 is a view in perspective of the whole wheel complete, to which is attached the gear-wheel for giving motion to other parts of the machinery necessary for harvesting grain. Fig. 2 is a view in perspective of the hub with its parts partially separated. Fig. 3 is an elevation of one of the spokes. Fig. 4 is a cross-section of the complete wheel, taken through the center of the spokes and lengthwise of the same. Fig. 5 is a view in perspective of the lugs or projections which receive one end of the spokes, and also serve to prevent the wheel from slipping on the ground. Fig. 6 is a view in perspective of the bearing or skein through which the axle passes on which the wheel revolves.

To enable others in the art to make and use my invention, I will proceed to describe the same in reference to the drawings.

Similar letters of reference in the several figures represent the same parts.

The hub which receives the spokes is made in two parts or disks, B and C, of malleable iron. The part C is made with the box $d$ cast upon it, which has a hole large enough to receive the skein. The other part, B, is a disk without a hub, but has a hole large enough to allow it to slip over that portion of the hub on C, as shown at $e$, Fig. 2. The spokes are made oval in form in their cross-section a portion of their length and at their large end, and of the right size to fit into recesses or oval-shaped forms, one-half in B and one-half in C. One of the spokes is shown in place at E, Fig. 2. The large end of the spokes abut against the hub $e$ on the flange or disk C, the ends being made in proper shape to fit the same when the spokes are inserted, as shown in Fig. 2, the flange or disk B is slid up on C until it comes in contact with the spokes, the recesses in B fitting over the spokes, and when in this position the two parts of the hub C and B are fastened firmly together by bolts and nuts, the bolts passing through the holes $b$. These spokes are made preferably of steel. The large end is oval, while the small end is round, in order to cut a screw thereon for the purpose of fastening the same to the rim. These screw-threads are cut far enough from the end of the spoke to receive a nut on the interior surface of the rim and something more. The spokes pass through holes in the rim, and are screwed into a hole provided with a thread in the center of the lug D.

The rim of the wheel, as made for a harvesting-machine, I make of a thin plate of rolled steel, provided with four slight projections, $a^2$ and $a^3$, rolled in to give strength to the rim, one on each edge and two in the center, $a^4$ and $a^5$, one on each side of where the spoke enters, and these two far enough apart to receive the nut, which is to be screwed up against the interior surface of the rim. The rim, when bent in the form of a circle, is riveted together, as shown in Fig. 1, a plate, $f$, being placed on the interior of the rim, made in form to fit over the projections $a^2$, $a^3$, $a^4$, and $a^5$.

The skein or journal G for the axle passes through the hub and is furnished with an arm, $b$, with branches opposite each other cast thereon, which is furnished with two holes, $b^2$, and is bolted to the flanges C and B of the hub, as shown at $g$, Fig. 1.

When the wheel is to be used on a harvesting-machine or other machine where it is necessary to impart motion from the wheel to other working parts of the machinery, I make one portion of the hub, as shown at $d$, Fig. 2, long enough to receive the hub of the gear-wheel H, or other suitable driving mechanism, and bolt the gear to the hub on the side opposite the skein in the same manner as the skein is bolted.

When the spokes are inserted in their sockets at their large ends, the nuts being on the small ends, and screwed down far enough to allow the small ends to project through the holes in the rim, and the nuts are screwed up against the interior surface of the rim sufficiently to bring an end strain between the hub and rim through the spokes, the lugs D are screwed onto the spokes and drawn down upon the exterior surface of the rim, and are riveted to the rim through holes $a'$ and corresponding holes in the rim; then, the ends of the spokes resting upon the exterior surface of the hub, the nuts are screwed against the interior surface of the rim, and the tendency of the strain is outward or from the center; and when the two parts C and B are firmly bolted together a very strong wheel is made, and at the same time it is very light.

When the wheel is required to be smooth on the exterior surface of the rim, and no lugs are required, as in a vehicle, the nuts can be screwed up against the interior of the rim, and the outside end of the hole in the rim countersunk, the small end of the spoke can be riveted down and held in that way and leave the surface of the rim smooth.

I am aware that other wheels have been used where a rim or web has been made in the center thicker than the rest of the rim of the wheel and broad enough to receive the spokes. With this construction there must be material enough for what is taken away by the holes to afford sufficient strength. In my arrangement there is a saving of material by making two projections, one on each side of the spokes, and the holes in the rim have only to be made in its thin part, which is a saving of both labor and material, and at the same time gives the greatest amount of strength.

In some cases wheels may be required of a much wider face, and in such cases it may be necessary to insert more projections between the edge of the rim and the center, and in other cases where the rim is required to be narrow all the projections may be dispensed with except the two in the center—one on each side of the spokes.

Having thus fully described my invention, what I claim therein as new, and desire to secure by Letters Patent, is—

1. The rim of the wheel made of metal and provided with two projections running around its interior surface far enough apart to receive the spokes between them and the nuts or their equivalents which hold the spokes to the rim with inwardly-flanged edges, substantially as and for the purpose described.

2. The hub formed in two pieces, one with a flange cast thereon, with recesses formed therein to receive one half of each of the spokes, and the other a shell or disk with corresponding recesses to receive the other half of the spokes, in combination with the spokes and their straining-nuts on the interior surface of the rim, substantially as and for the purpose described.

3. The combination of the skein G and its arms $b$ with the corrugated or recessed hub cast in two parts, with the spokes all resting upon said hub, fastened together by bolts between them, substantially as and for the purpose described.

4. The combination of the skein G with the corrugated or recessed hub cast in two parts, the spokes resting upon said hub and the gear-wheel H, fastened together, substantially as and for the purpose described.

5. The spokes fastened to the rim by a straining-nut on the interior surface of the rim, and the lugs on the outside surface of the rim, substantially as and for the purpose described.

6. The spokes abutting at their lower ends against the exterior surface of the hub furnished with threads and straining-nuts at their upper ends to screw against the interior surface of the rim, and their extreme ends held to the exterior surface of the rim by lugs riveted thereon, substantially as and for the purpose described.

7. The spokes abutting at their lower ends against the exterior surface of the hub, and clamped between the two corrugated flanges C and B of the hub, their upper ends furnished with a thread and nut to screw against the interior surface of the rim, and their extreme ends held to the exterior surface of the rim either by lugs or riveted into a countersink thereon, substantially as and for the purpose described.

JOHN MILTON ROSEBROOKS.

Witnesses:
  W. LOVEGROVE,
  E. C. PATTISON.